US005793498A

United States Patent [19]
Scholl et al.

[11] Patent Number: 5,793,498
[45] Date of Patent: Aug. 11, 1998

[54] SYSTEM FOR TRANSFERRING FACSIMILE DATA WITHOUT DEDICATED G3 HARDWARE

[75] Inventors: Thomas H. Scholl; Jeffrey A. Scott; William E. Witowsky, all of Gaithersburg, Md.

[73] Assignee: Telogy Networks, Inc., Germantown, Md.

[21] Appl. No.: 401,817

[22] Filed: Mar. 10, 1995

[51] Int. Cl.$^6$ ............................. H04N 1/00; H04N 1/32
[52] U.S. Cl. .............................. 358/434; 358/442
[58] Field of Search ...................... 382/100, 101, 382/102, 112, 186, 187; 358/400, 402, 403, 405, 442, 443, 445, 467, 468, 470, 434–439; 395/486, 487, 488

[56] References Cited

U.S. PATENT DOCUMENTS

| | | | |
|---|---|---|---|
| 3,958,088 | 5/1976 | Vieri | 379/100 |
| 5,014,300 | 5/1991 | Harvath et al. | 379/100 |
| 5,062,136 | 10/1991 | Gattis et al. | 358/426 |
| 5,091,790 | 2/1992 | Silverberg | 358/434 |
| 5,115,326 | 5/1992 | Burgess et al. | 358/440 |
| 5,191,525 | 3/1993 | Lebrun et al. | 364/419 |
| 5,461,488 | 10/1995 | Witek | 358/400 |
| 5,479,411 | 12/1995 | Klein | 358/403 |

FOREIGN PATENT DOCUMENTS

0157661  6/1989  Japan ........................ 379/63

*Primary Examiner*—Thomas D. Lee
*Assistant Examiner*—Jerome Grant, II
*Attorney, Agent, or Firm*—Roberts &Brownell LLC

[57] ABSTRACT

A system that provides supporting software to allow facsimile documents to be transferred via non-traditional mechanisms such as electronic mail, the Internet, and V.32 or other non-fax modems. The system allows facsimile documents to be transferred by computer without intermediate G3 facsimile hardware and without performing time-consuming compatibility determinations. The system also provides for cross-platform document transmissions.

50 Claims, 10 Drawing Sheets

SYSTEM FOR TRANSFERRING FACSIMILE DATA WITHOUT DEDICATED G3 HARDWARE

FIELD OF THE INVENTION

The present invention relates generally to systems for sending and receiving facsimile data transmissions. In particular, the present invention relates to communication systems that do not employ dedicated Group 3 or other facsimile-specific hardware yet are able to process facsimile data transmissions.

BACKGROUND OF THE INVENTION

Transmission and reception of facsimile ("fax") data currently relies on special-use hardware. This hardware is typically a Group 3 ("G3") fax modem or fax machine. There are several popular types of communications environments that are not compatible with facsimile data transmission. These include electronic mail, network file transfers, and transmission by is conventional modem. This incompatibility can cause inefficiencies in the modern workplace.

For example, if a company wants to electronically transmit a document created using a particular word processor and having a corporate logo, that company would probably fax the document because other methods of transmission may not be available and, even if they are, the time spent determining availability and setting up for the transmission would be prohibitively burdensome. To transmit the document by electronic mail ("E-mail"), for example, the sending company would have to determine if the receiving company has the same version of the same word processor, if it uses compatible E-mail compression and encoding software, etc., to properly receive and display or print the document.

Facsimile transmission of the document is relatively easy because the facsimile format is a standard transmission format, although it currently requires special-purpose hardware. Word processor formats and graphical standards are not standards for transmission and therefore documents are not as easily transmitted in their original form. Software currently exists (for example, WinFaxPro) which converts a document in an arbitrary format to data in a standardized format on disk in preparation for transfer via fax modem. However, this software is designed for use in a system transmitting through a directly-connected fax modem.

There are existing networks that accept G3 facsimile traffic, forward it through non-PSTN networks, and regenerate it as G3 facsimile at the destination. However, access to these networks is through a G3 facsimile device with a PSTN interface.

For example, U.S. Pat. No. 5,091,790 to Silverberg discloses a multi-purpose computer accessory for facilitating facsimile communication. The accessory interfaces a microcomputer with a fax line, and includes a facility for converting fax signals to ASCII form for application to a personal computer ("PC") port, and for converting signals of ASCII form received at the PC port to image data for conversion to fax signals. Because this is an accessory added on to complete a full facsimile processing arrangement, at least one G3 facsimile machine is still necessary, as is an additional fax modem on the receiving end.

U.S. Pat. No. 5,191,525 to Lebrun, et al. discloses a system for extracting data from documents for subsequent processing. The system is a document imaging system that can capture optical images of numerous intermixed documents of different sizes and formats, serially number them before or after image capture, automatically separate bank checks, identify the form or document under observation, and manipulate the image data. While this system recognizes different document forms, and converts the document data to digital image data, no system is disclosed for transmitting the digital image data between locations.

U.S. Pat. No. 5,014,300 to Harvath et al. discloses a system for accessing a facsimile store and forward network. The system provides a network access device and an address processing unit which form a network interface system that allows the originating facsimile machine to employ the store and forward network while being operated as if the message data were transmitted to a receiving facsimile machine in a point-to-point manner. While the system provides useful processing of facsimile data transmitted between two points, the originating point and the receiving point must still be G3 facsimile machines.

U.S. Pat. No. 5,115,326 to Burgess et al. discloses a method of encoding an E-mail address and a fax message and then routing the fax message to a destination on a network. The system encodes the fax message so that the receiving fax server is responsive to bar coded information included in the header of the fax message. This bar code information identifies a fax message as one that is going to be routed to an E-mail address, and provides the actual E-mail address to which the message should be sent. While this is an improvement over previous systems, the original message must still be sent using a G3 facsimile machine. A certain amount of detection must be performed before the message can be routed to the proper destination. The message itself must include special bar code information, and only a particular E-mail address can receive the message. The message must be sent to a fax server, and cannot be processed by a modem that does not have fax modem capability.

There is currently no integrated way to send facsimile data from one computer to another without using a fax modem.

SUMMARY OF THE INVENTION

It is therefore an object of the present invention to provide a system for processing, sending, and receiving facsimile data transmissions without using dedicated G3 hardware.

It is a further object of the present invention to provide a transparent path for facsimile data over networks that do not directly support the G3 protocol.

It is an additional object of the present invention to provide a system that allows facsimile data to be transferred by computer without performing time-consuming compatibility determinations.

These and other objects and advantages of the present invention will be apparent to those of ordinary skill in the art upon inspection of the detailed description, drawings, and appended claims.

Environment and Terminology

The system of the present invention shall herein be referred to as the software facsimile system, or the SoftFax™ system. SoftFax is a trademark of Telogy Networks, Inc.

The system of the present invention is herein described as a system for the transmission of facsimile data between two computers. This terminology will be used throughout, although the system of the present invention is not limited for use with two stand-alone computers. Any data processor may be used to send and receive the facsimile data. That is, the term computer can also mean a distributed network or any other entity that is capable of running a stored program, although for brevity only the term "computer" will be used.

A fax modem is a modem attached to a computer, either internally or externally, providing a Class 1 or Class 2 interface to the computer and a G3 facsimile interface as a PSTN subscriber. Class 1 and Class 2 are interface protocols defined by ANSI/EIA/TIA for controlling fax modems. The terminology "Class X" is used where either Class 1 or Class 2 is supported. "Class X" will also be used to refer to any other interface protocol adapted to control a fax modem. Group 3, or G3, is the current standard for facsimile transmission, transmitting one page of digital code in less than one minute at up to 9600 baud with data compression. While the present invention is described herein as providing an alternative to facsimile transmission for G3 data, the present invention is equally able to transfer data intended to be processed by older fax machines using, for example, the Group 1 or Group 2 standard. Likewise, higher-speed fax machines such as Group 4 are not yet standard, yet the system of the present invention is contemplated for use in processing Group 4 fax data. The particular format of the fax data to be transferred is not a limitation on the capability of the system of the present invention, which is intended for use when any fax data is to be transferred without the use of fax-specific hardware. Because G3 is the current standard, this standard shall be used in the description to indicate any fax-format data.

A fax application is a software program that allows a computer user to send and receive facsimile data through an attached fax modem. An example of such a fax application is WinFaxPro. The system of the present invention is contemplated for use with any such fax application, whether standard, commonly available, or proprietary.

A device driver, as used in a computer, provides standardized access to a device on the computer. The device may be a physical entity, such as a communications port, or may be a layer of software, such as an OSI protocol stack.

Electronic mail, or E-mail, is data communication enabled by a computer program. An E-mail message may contain raw binary data that is not altered by the E-mail program. For example, the E-mail message can contain a binary-coded image created by the facsimile document converter.

A network interface is the interface between a computer and a network. There are many types of networks and each network has its own software interface within the computer. For example, access to the Internet is achieved through TCP/IP software. Access to a Novell network is available through Novell software. At the lowest level, the network software interface inside a computer uses various device drivers to access the physical network. Access to the network may be available on a dial-up basis.

An Inter-Application Communication (IAC) is the ability provided by computer operating systems for one application to activate another application and exchange information with it. This is supported, for example, in Microsoft Windows, IBM OS/2, UNIX, and other operating systems.

Disclosure

The system of the present invention provides means for allowing facsimile documents to be transferred via nontraditional mechanisms such as electronic mail, the Internet, and V.32 or other non-fax modems. That is, the system allows facsimile documents to be transferred by computer without intermediate facsimile-specific hardware and without performing time-consuming compatibility determinations. The system also provides for cross-platform document transmissions. Features of the system include the capability to provide fax transfer between computers over any kind of connecting network (for example, the Internet, a local-area network, a PSTN dial-up connection, a wireless network). This can be accomplished by the system without using a fax modem at either the source or destination computer, and takes place in a manner that is transparent to a user, regardless of compatibility between the computers or of the software used by each computer. That is, the system provides ease of use on both the transmit side and the receive side because automatic compatibility is enabled when data is converted. ASCII conversions alone do not provide this capability. The system can use a dial-up modem which does not have fax capability to complete the fax transfer. The system also allows fax applications (for example, WinFaxPro) to transparently use network connectivity which was not previously anticipated. The system defines a standard format for facsimile storage, and provides facsimile compression and encryption if desired.

The SoftFax Binary Format (or simply "SoftFax Format" or system standard format) is a standardized storage structure for facsimile documents and the standard format for data transmission using the system. It comprises two sections: the header and the facsimile data. The header describes the format of the facsimile data, including information on compression, encryption, and the original format of the facsimile document. The facsimile data comprises the facsimile document data in the standard format encoded according to the header information. When converted facsimile data is transferred between computers according to the present invention, the data will be in this standard format.

Data in the original format is converted to the SoftFax format for storage or transmission. If stored, the data may be transferred to a second computer at a later time. When the data is provided to the second computer, either by transmission at the time of conversion or by subsequent transfer, the data is once again converted, this time to a format selected by a user or by some other means at the second computer. Either the originating format data or the selected format data or both may be G3 facsimile data. The data is transferred between computers in the standard format.

At the second computer, the header is recognized and decoded. If the header shows that the data has been compressed and/or encrypted, the facsimile data is decrypted and/or decompressed according to parameters included in the header. The original format information is checked, a new format is selected, and conversion to the selected format takes place. If desired, an optical character recognition ("OCR") process or other character recognition technique can be applied automatically to the converted received data. This is particularly useful when textual data is transmitted in a graphical format and is to conform to a word processing application on the receive end.

DETAILED DESCRIPTION OF THE PRESENT INVENTION

Figure 1:
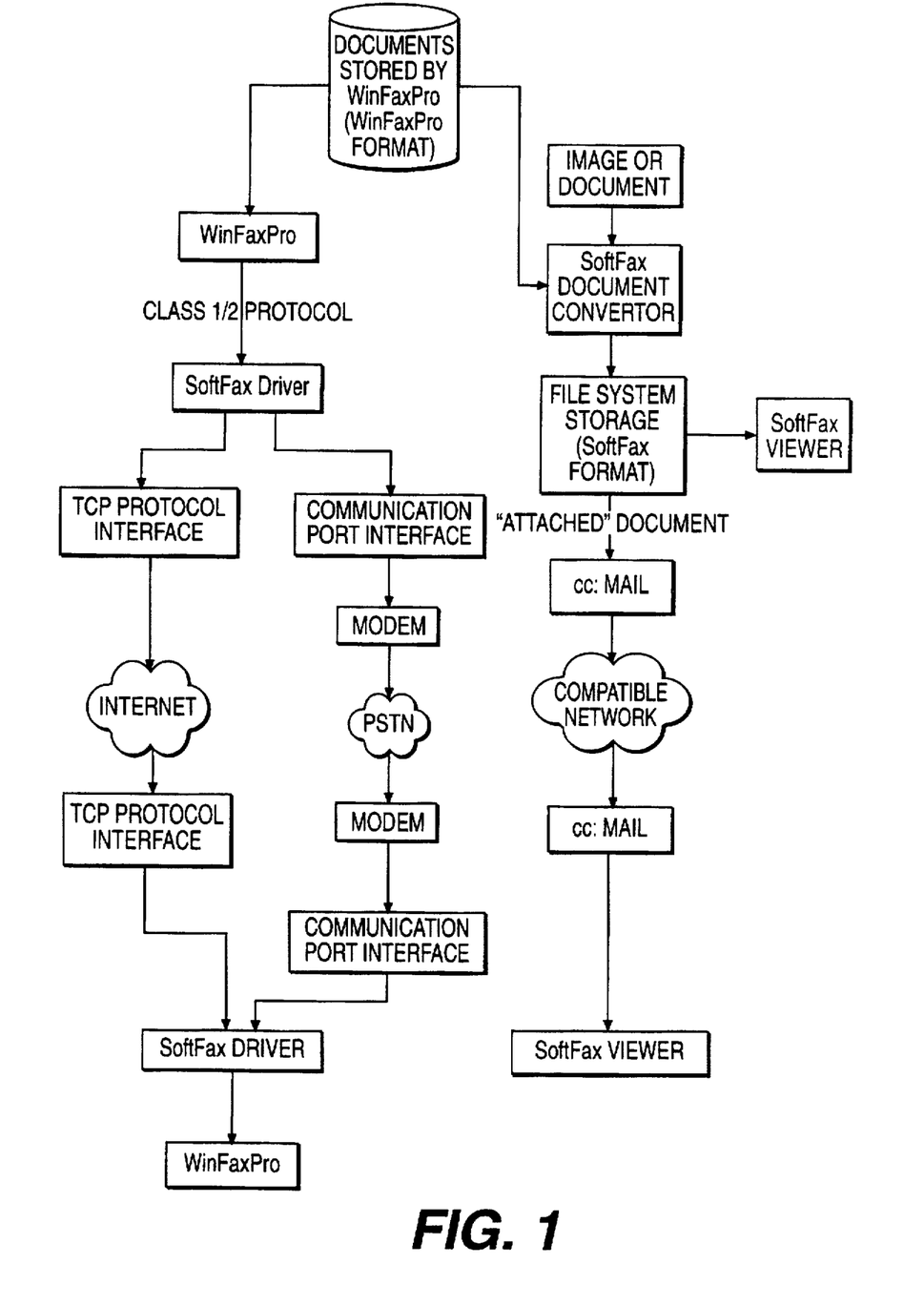
FIG. 1 shows a typical network setup with the system of the present invention in place.

The system of the present invention includes three main components: a SoftFax Viewer, a SoftFax Document Converter, and a SoftFax Driver. FIG. 1 shows a typical network setup with the system of the present invention in place.

The SoftFax Viewer displays an image of the facsimile document to be sent or received as a file transfer or as an attachment to a transmission. The SoftFax Viewer displays a facsimile document that is stored in the system standard format of the present invention. All display modes available in the host computer are supported by the SoftFax Viewer. The viewed facsimile can be saved in various popular image and document formats such as TIFF, GIF, PCX, etc. The SoftFax Viewer supports input and output processes using all mechanisms supplied by the host computer and operating systems, including video, file system, printing, and IAC. As shown, the SoftFax viewer can be used to present an image of the transferred facsimile data on the transmit side and/or the receive side of the transfer.

The SoftFax Document Converter processes a document in preparation for transfer by converting any file into the system standard format for storage on disk or other storage medium, and for future transfer through use of the system, or for transmission directly after conversion. The original file may be in one of a variety of originating formats prior to conversion, including GIF images, plain ASCII files, and TIFF images. As previously discussed, the stored, converted file has a header identifying the original format as well as compression and encryption options used in the conversion. The SoftFax Document Converter supports input and output functions using all mechanisms supplied by the host computer and operating system, including video, file system, printing, and IAC.

The SoftFax Driver, a device driver utilized by the system of the present invention, acts as a Class 1/Class 2 modem or as any other device adhering to computer-to-modem facsimile interface standards (CMIS) with respect to the application software, providing a transparent path for facsimile data over networks which do not directly support G3 protocol or other fax protocols. When a software application such as WinFaxPro accesses a communications port, the access will actually be to the SoftFax Driver, which appears to the application to be a normal communications port.

The SoftFax Document Converter and the SoftFax Driver can be thought to act as an "upper" interface and a "lower" interface, respectively. The upper interface provides the appearance of a Class X modem to applications providing system input through the SoftFax Document Converter. At the lower, or "network", interface, the SoftFax Driver uses other software interfaces such as TCP/IP or Novell or attached hardware such as a dial-up-modem to access another SoftFax Driver running on a remote computer. The SoftFax Driver isolates a fax application based on the fact that the facsimile is not going through a fax modem. It provides the added value of allowing facsimile data to traverse networks that do not directly support G3 or other fax protocols.

Figure 2:
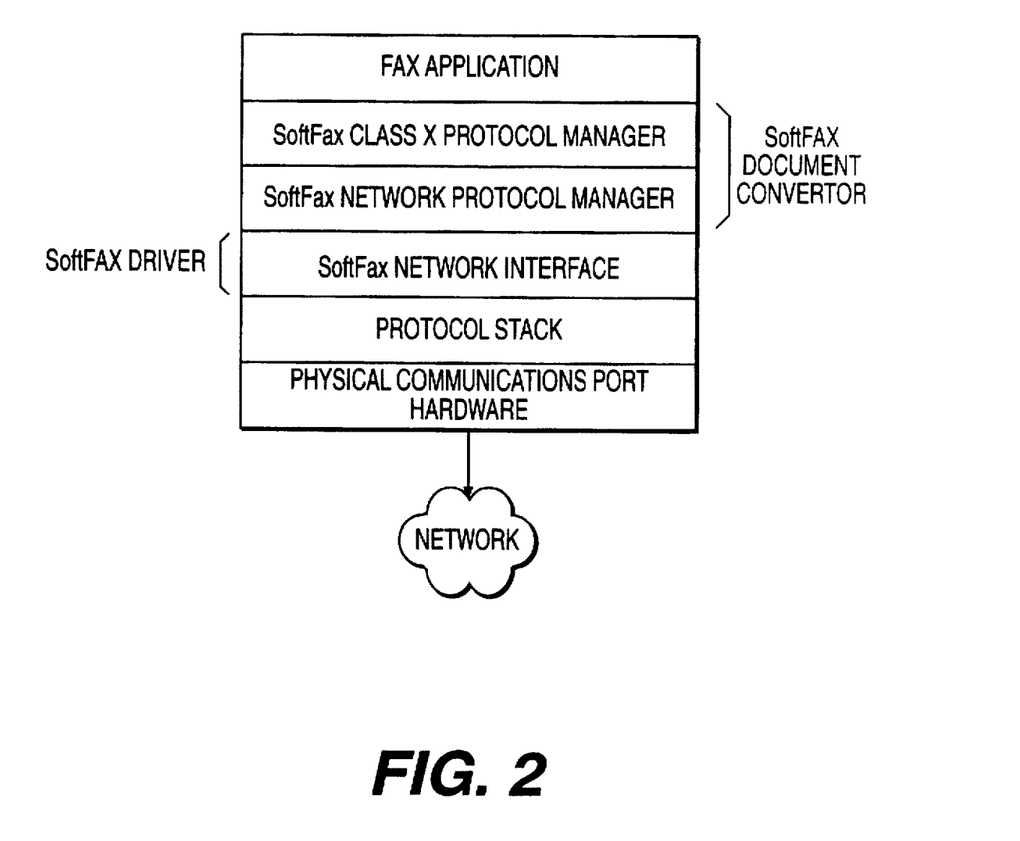
FIG. 2 shows an example where the connecting network is a general network such as the Internet.

In the preferred embodiment, the SoftFax Document Converter and the SoftFax Driver provide only a Class X interface to system input applications, making use of a variety of interfaces on the "network" side, including the following:

Network Software: OSI protocol stacks such as TCP/IP or Novell. This is illustrated in FIG. 2.

Figure 3:
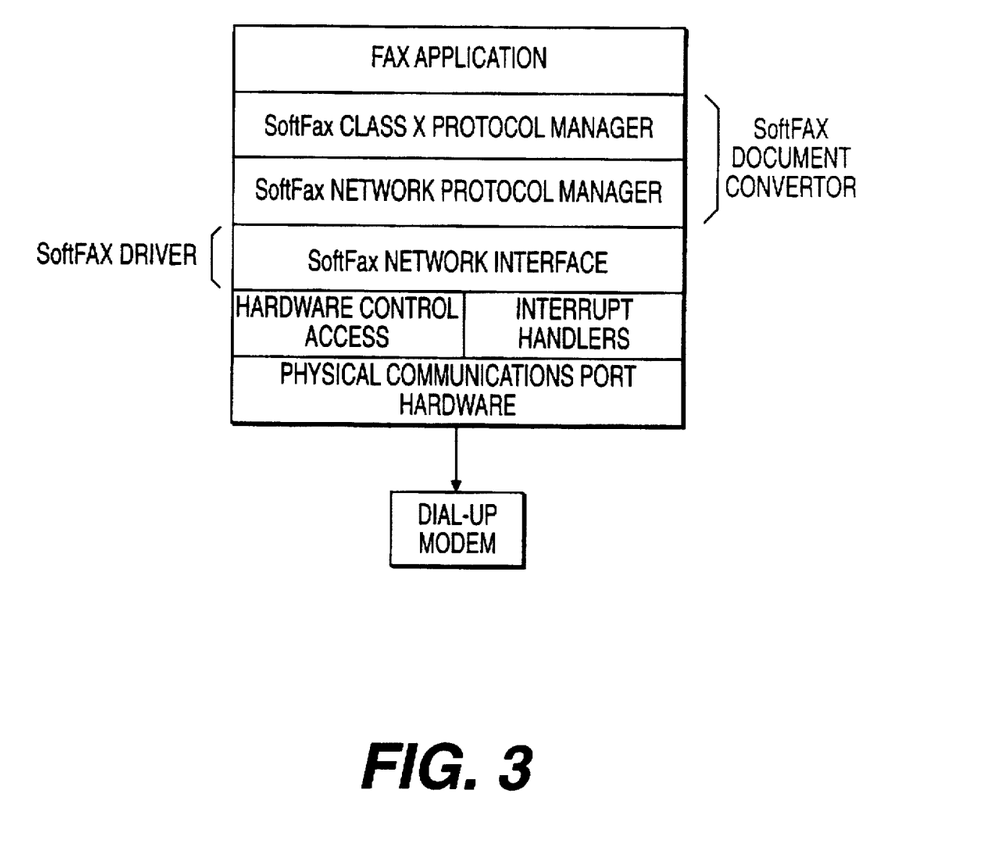
FIG. 3 shows an example where the connecting "network" is a dial-up modem.

Communications Port: I/O port with a connected dial-up modem. This is illustrated in FIG. 3.

Figure 4:
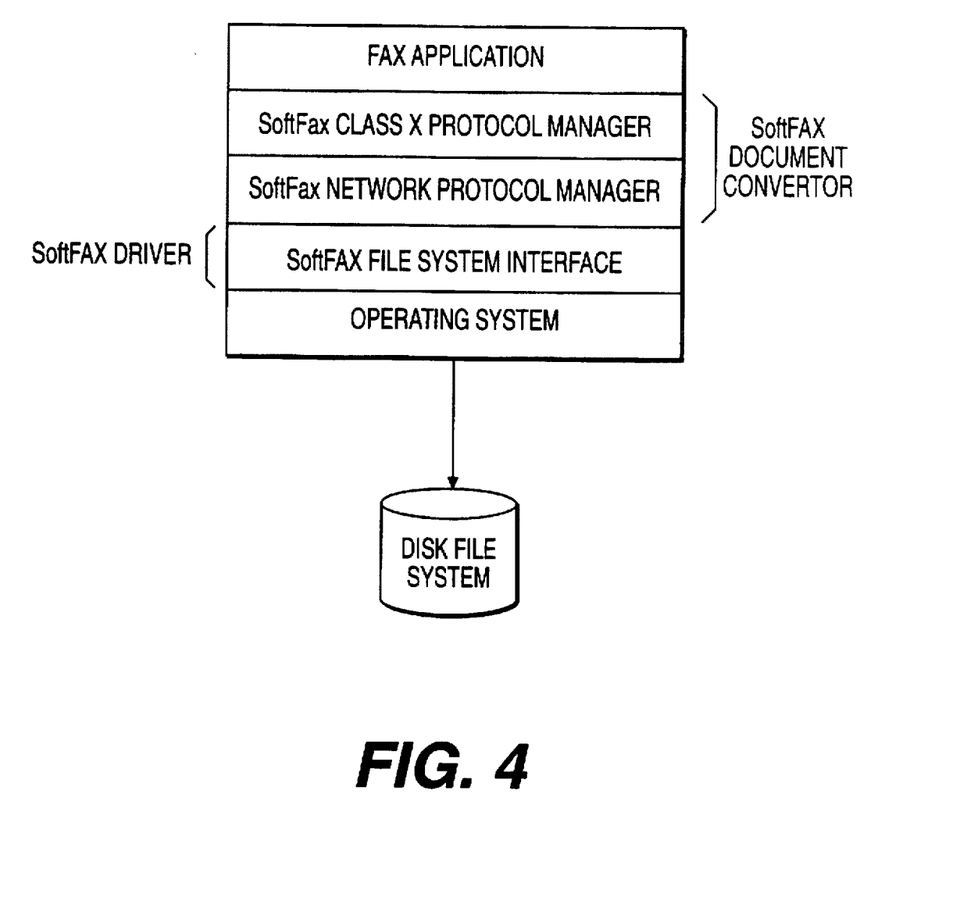
FIG. 4 shows an example where the connecting "network" is a disk file system.

File System: Access to disk-based file systems holding facsimile information in system format. This is illustrated in FIG. 4.

Figure 5:
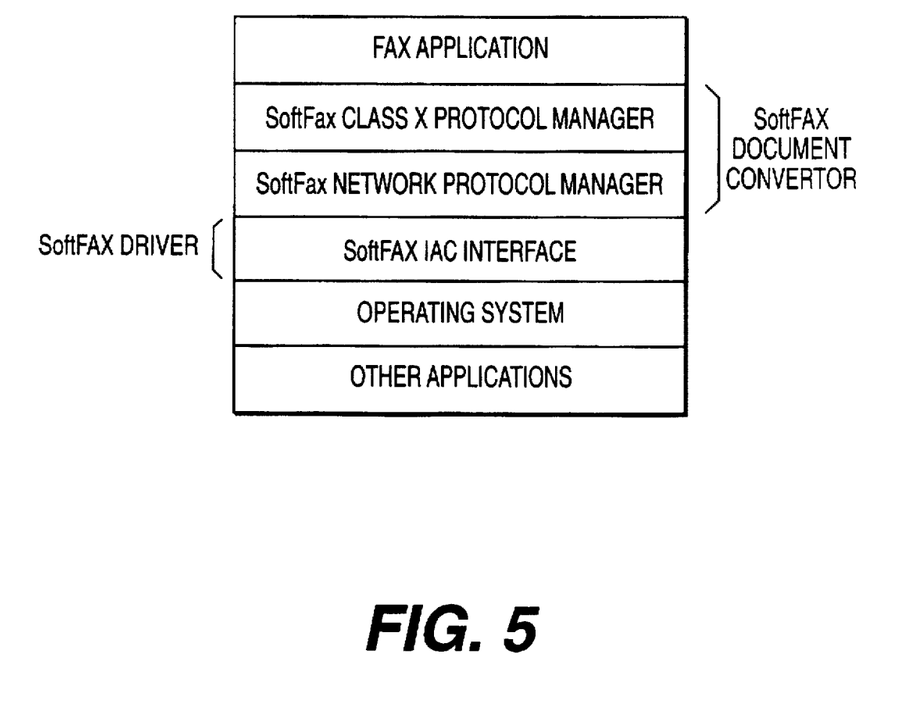
FIG. 5 shows an example where the connecting "network" is an Inter-Application Communication interface to one or more other applications.

IAC: A data stream in system format to or from another application. This is illustrated in FIG. 5.

It is important to note that the figures show conceptual software organization examples and are not meant to restrict the present invention to a particular arrangement of functional design blocks.

The following text describes the main functional components of the SoftFax Document Converter and the SoftFax Driver in more detail.

The SoftFax Document Converter includes a SoftFax Class X Protocol Manager, which makes the input application believe that a Class X modem is connected to a communications port, and responds to all Class X commands with appropriate responses according to ANSI/EIA/TIA specifications. For each Class X command that is received, an appropriate set of commands is generated to a SoftFax Network Protocol Manager, also part of the SoftFax Document Converter. Responses from the SoftFax Network Protocol Manager are converted into an appropriate set of Class X responses. The SoftFax Class X Protocol Manager also provides appropriate, timely Class X protocol interaction regardless of current network state in order to simulate the behavior of a destination fax device.

The SoftFax Network Protocol Manager implements the standard system network protocol. This is the protocol which manages the transfer of facsimile documents over an arbitrary network. This functional block preferably includes the following subcomponents:

System Protocol State Machine: Implements the System protocol;

Encryption/Decryption: Encrypts outgoing documents to increase security and decrypts incoming documents (optional);

Compression/Decompression: Compresses outgoing documents to conserve network bandwidth and decompresses incoming documents (optional).

The SoftFax Driver includes a SoftFax Network Interface, which handles the details of interacting with the connecting physical network. This block must perform different functions depending on the network, as illustrated in the following examples.

FIG. 2 shows an example where the connecting network may be, for example, the Internet. As shown, the facsimile data is presented to the SoftFax Document Converter in an originating format dictated by the fax application used. In this case, the SoftFax Document Converter comprises a SoftFax Class X protocol manager and the SoftFax Network Protocol Manager, which convert the facsimile data to the SoftFax format, which is the standard format for the system. The SoftFax Driver then provides access to the network for the standard format data. In this example, the SoftFax Driver comprises a SoftFax Network Interface. The protocol stack block is the software interface to the TCP/IP protocols used to connect to the Internet. In this case, the SoftFax Network Interface uses established interfaces to the Protocol Stack to make and break connections to remote SoftFax Drivers.

FIG. 3 shows an example where the connecting "network" is a dial-up modem connected to a communications port. In this case, the SoftFax Network Interface provides an interface to the hardware and the interrupt handlers. As in the last example, the fax application provides the facsimile data in an originating format, which is converted to the SoftFax format by the SoftFax Document Converter and made available to the modem by the SoftFax Driver.

FIG. 4 shows an example where the connecting "network" is a disk file system. In this example, the standard format facsimile data may be transmitted to a remote computer at a later time rather than at the time of conversion. The data is stored for later transmittal or for transfer by physically bringing a disk from the disk file system over to a second computer and copying the data to the second computer. As in the previous examples, the facsimile data in the originating format is provided by the fax application. The data is converted to the system standard format by the SoftFax Document Converter, and the data is made available to the operating system controlling the disk file system by the SoftFax Driver. The SoftFax File System Interface functional block interacts with the disk file system to read or write facsimile data in the SoftFax format.

FIG. 5 shows an example where the connecting "network" is an IAC Interface to one or more other applications. Rather than transmitting the data at the time of conversion, the data may be viewed or manipulated using a resident application. The fax application makes the facsimile data available in an originating format, the SoftFax Document Converter transforms the format to the SoftFax format, and the SoftFax Driver makes the converted data available to the operating system running the target application. The SoftFax IAC Interface functional block interacts with the operating system to exchange facsimile data in the SoftFax format with other applications programs.

EXAMPLES OF THE USE OF THE SYSTEM

Example 1
WinFaxPro Facsimile Transfer over V.34 Modem

Figure 6:
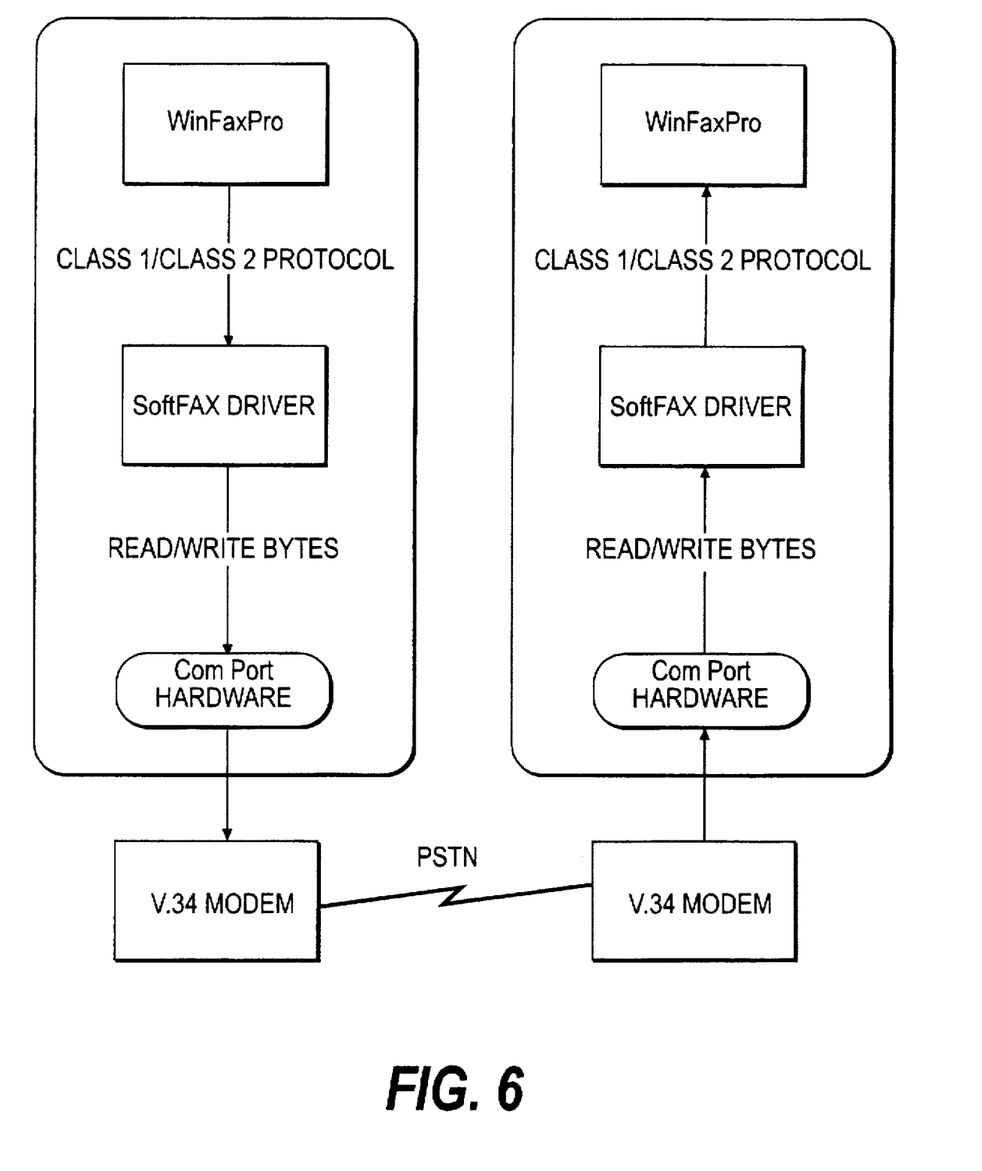
FIG. 6 shows a facsimile transfer to using V.34 modems.

FIG. 6 shows a diagram of a fax application such as WinFaxPro resident on one computer sending a facsimile to another computer over the PSTN via high-speed V.34 modems. Since G3 protocols are not used, the fastest speed of the modem can be used. This type of transfer uses a SoftFax Document Converter and a SoftFax Driver configured as shown in FIG. 3.

Figure 7:
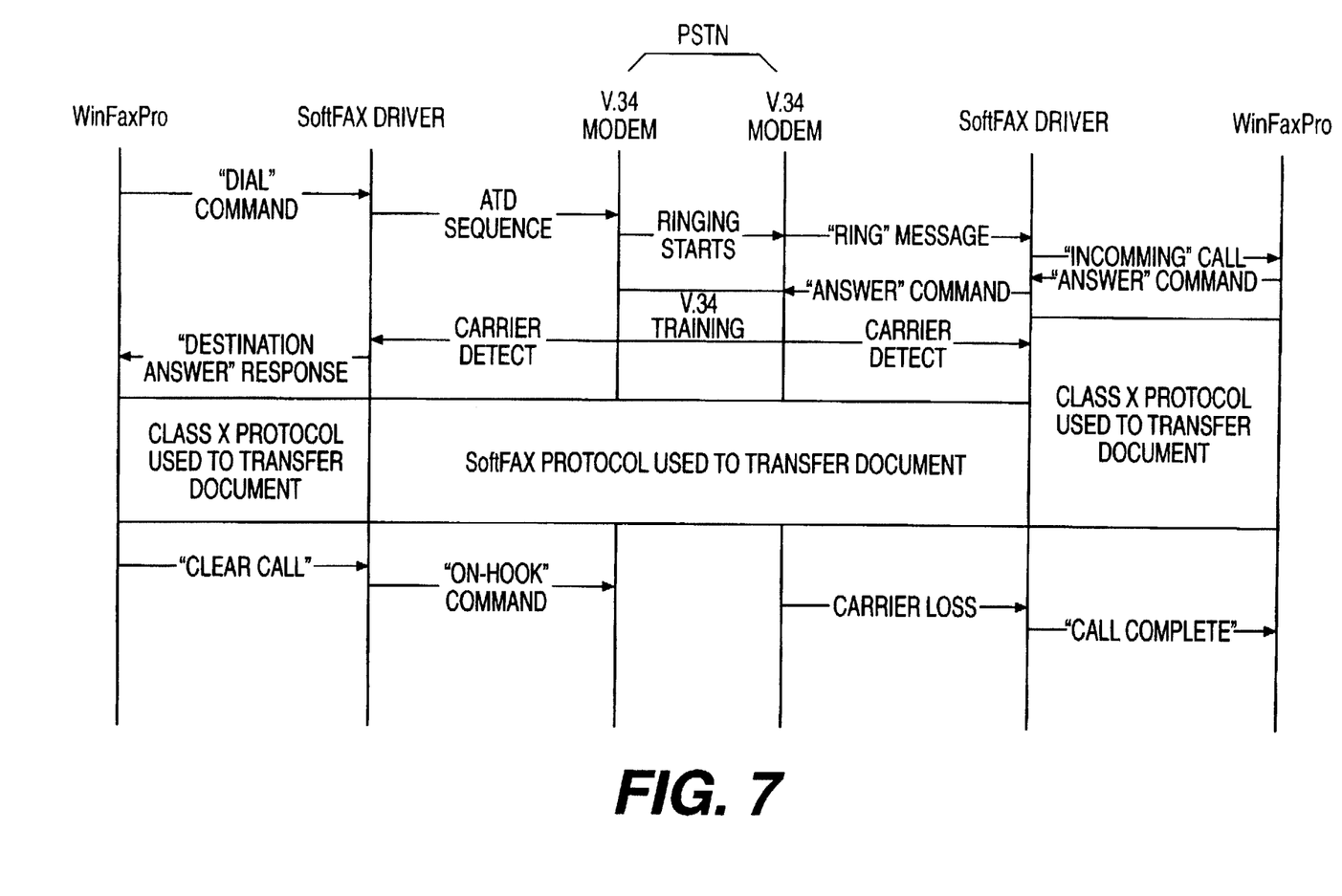
FIG. 7 shows a sequence of main communication events between the SoftFax Driver and surrounding elements.

FIG. 7 shows the sequence of the main communication events between the SoftFax Driver and surrounding elements. Note in particular that the SoftFax Driver in the destination computer may begin handling Class X protocol before there is an end-to-end connection between both SoftFax Drivers. The SoftFax Driver always preserves the illusion that WinFaxPro is communicating directly with a Class X modem.

Example 2
WinFaxPro Facsimile Transfer over a TCP/IP Network

Figure 8:
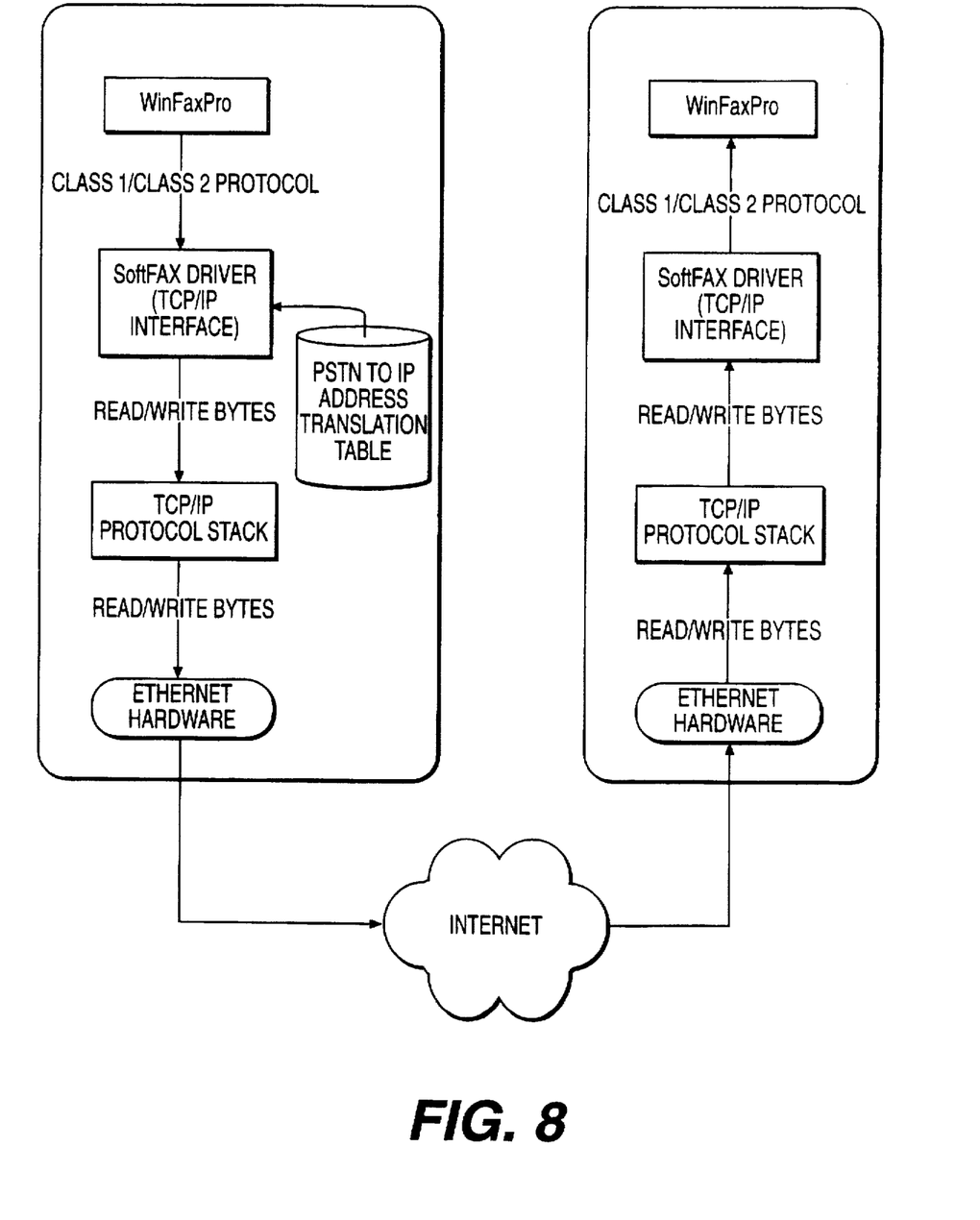
FIG. 8 shows a fax application sending facsimile data over a TCP/IP network.

In the case of a TCP/IP network, the destination of the call will be a SoftFax Driver in a computer on the destination network. FIG. 8 shows a diagram of a fax application such as WinFaxPro sending a facsimile over a TCP/IP network using the SoftFax Driver. This is similar to the previous example except for the additional requirement that the PSTN number "dialed" by WinFaxPro must be translated into the IP address of the destination computer. This can be done by the system using a previously-entered translation table which gives, for each possible called PSTN number, a valid destination IP address.

Alternatively, a convention could be established regarding the format of the called PSTN number. Since an IP address is usually formatted as four groups of 3-digit numbers, the PSTN number "dialed" by WinFaxPro could, by convention, always contain exactly 12 digits and the SoftFax Driver will parse the number into four groups of 3 digits to form the IP address.

Figure 9:
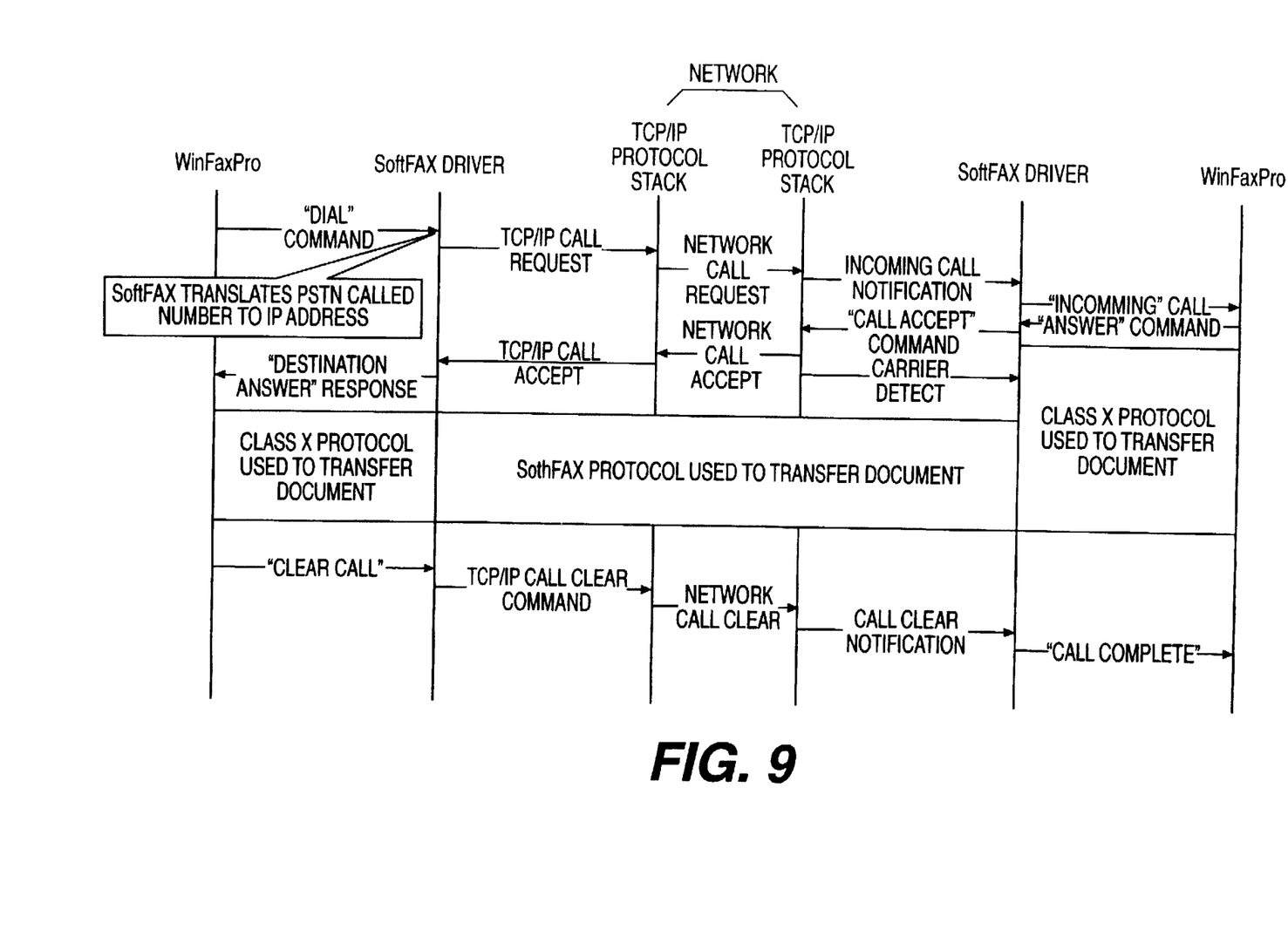
FIG. 9 shows a sequence of events when the SoftFax Driver is used with a fax application over a TCP/IP Network.

FIG. 9 shows an example sequence of events which might occur when the SoftFax Driver is used with a fax application such as WinFaxPro over a TCP/IP network.

Example 3
Transfer through E-mail

Figure 10:
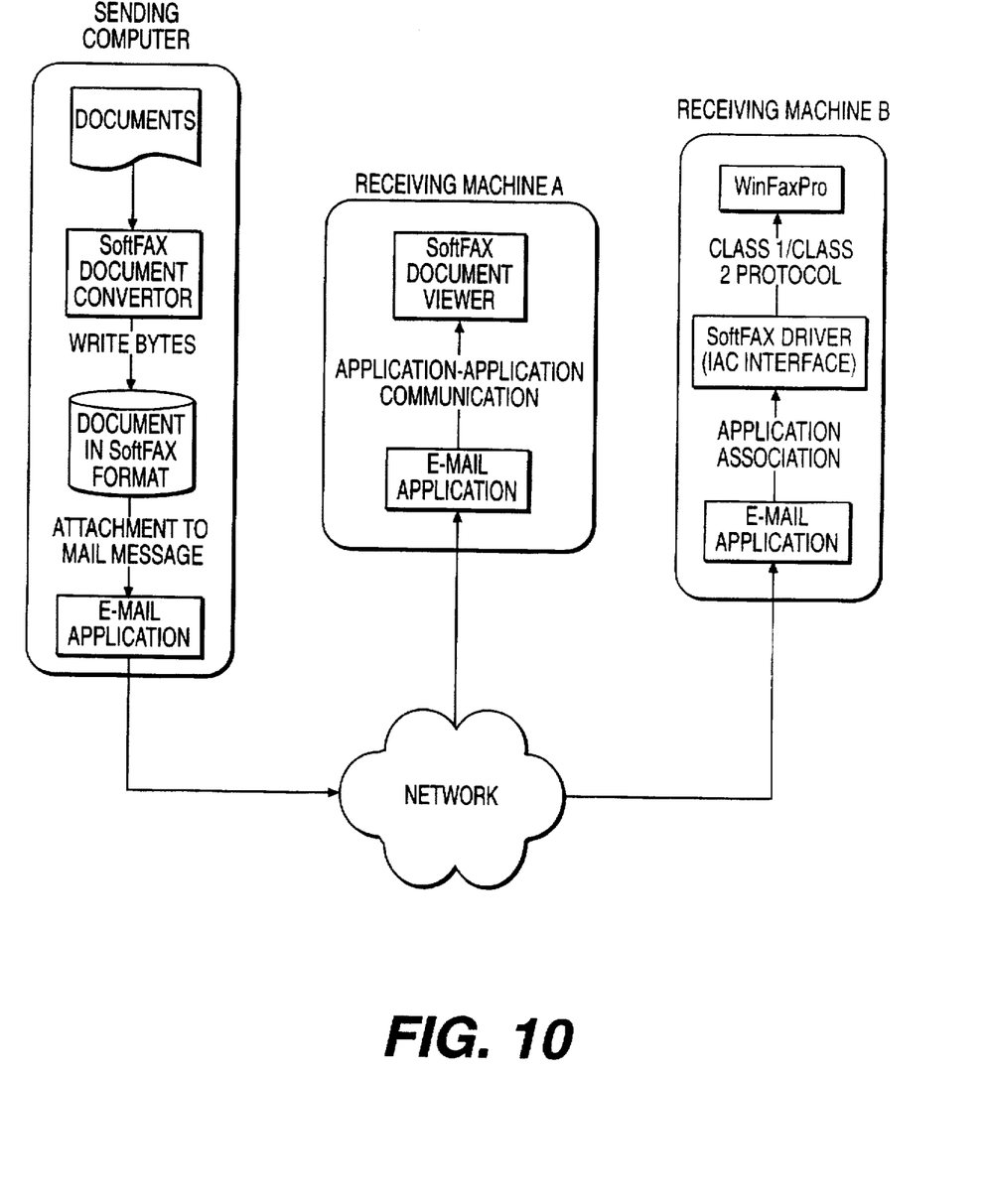
FIG. 10 shows an example of the system of the present invention used to send facsimile data by electronic mail.

FIG. 10 shows an example use of the system of the present invention to send facsimile data by electronic mail. The diagram shows one sending computer and two receiving computers, each of which use the system differently to read the facsimile data. More than two receiving computers can be set up to accept the fax data transfer. This is useful when the sending computer transmits a fax broadcast to a number of receiving computers.

At the sending computer, a document is processed through the SoftFax Document Converter and is stored on disk in SoftFax format. The saved facsimile data is attached to a mail message and sent to two destinations. Receiving computer A uses its IAC feature to view the received facsimile image directly with the SoftFax Document Viewer. Receiving computer B uses its IAC feature to send the received facsimile data to the SoftFax Driver, which forwards it to the local WinFaxPro application. At the sending machine, the facsimile data could also have originated from a fax application such as WinFaxPro.

Preferred and alternative embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the present invention, be apparent to those of ordinary skill in the art.

For example, although the system of the present invention realizes its greatest advantage over current systems when the data to be transmitted is G3 facsimile data, the data at the transmit computer may be data in any originating format. In such a case, the selected format at the receiving computer may be G3 facsimile. Thus, the system can take data in an unspecified format, convert it to the system standard format, transmit the data, and convert it to G3 facsimile data. Likewise, the originating format may be G3 facsimile and the selected format at the receiving computer may also be G3 facsimile. It should be apparent to anyone of ordinary skill in the art that the system of the present invention is useful for transmitting data between two points without the use of G3 hardware, whether the original data or the final form of the received data or both are in G3 facsimile format. This data transfer takes place regardless of any incompatibility between the sending computer and the receiving computer and of any difference in the software run on those computers.

What is claimed is:

1. A communications system for sending and receiving facsimile data, comprising:

(a) a first computer;

(b) a second computer; and

(c) a connecting network disposed to connect the first computer to the second computer;

(d) the first computer comprising a first document converter adapted to convert input data in a facsimile-specific original format to converted data conforming to a softfax format, and the first computer further comprising a first device driver disposed to transfer the converted data conforming to the softfax format to the connecting network;

(e) the second computer comprising a second device driver adapted to transfer the converted data conforming to the softfax format on the connecting network to the second computer, the second computer further comprising a second document converter disposed to accept and convert the converted data conforming to the softfax format to conform to a selected format; and (f) the first computer, first document converter and first device driver operating without prior knowledge of the selected format.

2. The communications system of claim 1, wherein the first document converter comprises a means for emulating a Class X modem.

3. The communications system of claim 1, wherein the first document converter comprises a Class X protocol manager and a network protocol manager.

4. The communications system of claim 1, wherein the first device driver is connected to a dial-up modem and the first device driver comprises hardware control access logic.

5. The communications system of claim 1, wherein the first device driver is connected to a disk file system and the first device driver comprises a file system interface.

6. The communications system of claim 1, wherein the first device driver comprises an inter-application communication interface.

7. The communications system of claim 1, wherein the connecting network is the Internet.

8. The communications system of claim 1, wherein the original format is Group 3 facsimile.

9. The communications system of claim 1, further comprising a document viewer connected to the first computer and adapted to present a visual image of the converted data conforming to the softfax format.

10. The communications system of claim 1, further comprising means for applying a character recognition technique to the selected format data.

11. The communications system of claim 1, wherein the softfax format comprises:

(a) a header comprising compression data, encryption data, and original format data; and (b) fascimile data comprising the input data encoded according to the header.

12. The communications system of claim 1, wherein the first computer comprises means for encrypting the converted data conforming to the softfax format and the second computer comprises means for decrypting the converted data conforming to the softfax format.

13. The communications system of claim 1, wherein the first computer comprises means for compressing the converted data conforming to the softfax format and the second computer comprises means for decompressing the converted data conforming to the softfax format.

14. The communications system of claim 1, wherein the selected format is a non-facsimile format.

15. The communications system of claim 1, wherein the connecting network is a wireless network.

16. The communications system of claim 1, further comprising a document viewer connected to the second computer and adapted to present a visual image of the converted data conforming to the softfax format.

17. The communications system of claim 1, wherein the selected format is a facsimile-specific format.

18. The communications system of claim 17, wherein the selected format is Group 3 facsimile.

19. A process for transferring facsimile data, comprising:

(a) converting input data in a facsimile-specific original format to converted data conforming to a softfax format;

(b) providing access for the converted data conforming to the softfax format to a connecting network;

(c) transferring the converted data conforming to the softfax format across the network;

(d) converting the converted data conforming to the softfax format to a selected format; and (e) wherein the transferring of the converted data conforming to the softfax format occurs without the prior knowledge of the selected format.

20. The process of claim 19, wherein converting the input data in a facsimile specific original format to converted data conforming to the softfax format is performed automatically.

21. The process of claim 19, wherein converting the converted conforming to the softfax format to the selected format is performed automatically to a preselected format.

22. The process of claim 19, wherein the connecting network is the Internet.

23. The process of claim 19, further comprising emulating a Class X modem previous to providing access to the connecting network.

24. The process of claim 19, further comprising presenting a visual image of the converted data conforming to the softfax format.

25. The process of claim 19, wherein the softfax format comprises:

(a) a header comprising compression data, encryption data, and original format data; and facsimile data comprising the input data encoded according to the header.

26. The process of claim 19, further comprising encrypting the converted data conforming to the softfax format before transferring the converted data conforming to the softfax format across the connecting network and decrypting the converted data conforming to the softfax format after transferring the converted data conforming to the softfax format across the connecting network.

27. The process of claim 19, further comprising compressing the converted data conforming to the softfax format before transferring the converted data conforming to the softfax format across the connecting network and decompressing the converted data conforming to the softfax format after transferring the converted data conforming to the softfax format across the connecting network.

28. The process of claim 19, wherein the original format is Group 3 facsimile.

29. The process of claim 19, wherein the connecting network is a wireless network.

30. The process of claim 19, further comprising applying a character recognition technique to the selected format data.

31. The process of claim 19, wherein the selected format is a facsimile-specific format.

32. The process of claim 31, wherein the selected format is Group 3 facsimile.

33. A communications system for sending and receiving facsimile data, comprising:

(a) a sending computer;

(b) a plurality of receiving computers;

(c) a connecting network disposed to connect the sending computer to the plurality of receiving computers;

(d) the sending computer comprising a sending document converter adapted to convert input data in a facsimile-specific original format to converted data conforming to a softfax format, the sending computer further comprising a sending device driver disposed to transfer the converted data conforming to the softfax format to the connecting network;

(e) each of the plurality of receiving computers comprising a receiving device driver adapted to transfer the converted data conforming to the softfax format to the connecting network to each of the plurality of receiving computers, each of the plurality of receiving computers further comprising a receiving document converter disposed to accept and convert the converted data conforming to the softfax format to conform to a selected format; and (f) the sending computer, sending document converter and sending document driver further adapted to transfer the converted data conforming to the softfax format to the connecting network without prior knowledge of the selected format.

34. A communications system for sending and receiving facsimile data, comprising:

(a) a first computer;

(b) a second computer;

(c) a connecting network disposed to connect the first computer to the second computer;

(d) the first computer comprising a first document converter adapted to convert input data in a non-facsimile original format to converted data conforming to a softfax format, the first computer further comprising a first device driver for transferring the converted data to the connecting network;

(e) the second computer comprising a second device driver for transferring the converted data conforming to the softfax format on the connecting network to the second computer, the second computer further comprising a second document converter for accepting and converting the converted data conforming to the softfax format to conform to a facsimile-specific selected format;

(f) the first computer, first document converter and first device driver further adapted to transfer the converted data conforming to the softfax format to the connecting network without prior knowledge of the facsimile-specific selected format.

35. The communications system of claim 34, wherein the connecting network is the Internet.

36. The communications system of claim 34, wherein the selected format is Group 3 facsimile.

37. The communications system of claim 34, further comprising a document viewer connected to the first computer and adapted to present a visual image of the converted data conforming to the softfax format.

38. The communications system of claim 34, wherein the softfax format comprises:

(a) header comprising compression data, encryption data, and original format data; and facsimile data comprising the input data encoded according to the header.

39. The communications system of claim 34, wherein the first computer comprises means for encrypting the converted data conforming to the softfax format and the second computer comprises means for decrypting the converted data conforming to the softfax format.

40. The communications system of claim 34, wherein the first computer comprises means for compressing the converted data conforming to the softfax format and the second computer comprises means for decompressing the converted data conforming to the softfax format.

41. The communications system of claim 34, wherein the connecting network is a wireless network.

42. The communications system of claim 34, further comprising a document viewer connected to the second computer and adapted to present a visual image of the converted data conforming to the of softfax format.

43. The communications system of claim 34, further comprising means for applying a character recognition technique to the selected format data.

44. A communications system for sending and receiving facsimile data, comprising:

(a) a computer;

(b) a disk file system;

(c) a connecting network disposed to connect the computer to the disk file system;

(d) the computer comprising a document converter adapted to convert input data in a facsimile-specific original format to converted data conforming to a softfax format, the computer further comprising a device driver for transferring the converted data conforming to the softfax format to the connecting network;

(e) the disk file system being adapted to accept and store the converted data conforming to the softfax format and (f) the computer, document converter and device driver further adapted to transfer the converted data conforming to the softfax format to the connecting network without prior knowledge of the disk file system.

45. The communications system of claim 44, further comprising a receiving computer, the receiving computer comprising:

(a) a receiving device driver for transferring the converted data conforming to the softfax format; and (b) a receiving document converter for accepting and converting the converted data conforming to the softfax format to conform to a selected format.

46. A process for transferring facsimile data, comprising:

(a) converting input data in a facsimile-specific original format to converted data conforming to a softfax format;

(b) storing the converted data conforming to the softfax format;

(c) providing access to a connecting network for the stored converted data conforming to the softfax format;

(d) transferring the converted data conforming to the softfax format across the connecting network;

(e) converting the converted data conforming to the softfax format to a selected format; and (f) wherein the transferring of the converted data conforming to the softfax format occurs without prior knowledge of the selected format.

47. The process of claim 46, wherein converting the input data in a facsimile specific original format to converted data conforming to the softfax format is performed automatically.

48. The process of claim 46, wherein converting the converted data conforming to the softfax format to the selected format is performed automatically to a preselected format.

49. The process of claim 46, further comprising converting the converted data conforming to the softfax format to a selected format.

50. The process of claim 49, further comprising applying a character recognition technique to the selected format data.

* * * * *